United States Patent [19]

Sarin et al.

[11] 4,421,525

[45] Dec. 20, 1983

[54] ALUMINA COATED COMPOSITE SILICON NITRIDE CUTTING TOOLS

[75] Inventors: Vinod K. Sarin, Lexington; Sergej-Tomislav Buljan, Acton; Charles D'Angelo, Southboro, all of Mass.

[73] Assignee: GTE Laboratories Incorporated, Waltham, Mass.

[21] Appl. No.: 380,379

[22] Filed: May 20, 1982

[51] Int. Cl.$^3$ ............................................. B24D 11/00
[52] U.S. Cl. ....................................... 51/295; 51/308; 51/309; 427/214; 428/404
[58] Field of Search ......................... 51/295, 308, 309; 427/214; 428/404, 701

[56] References Cited

U.S. PATENT DOCUMENTS 3,914,473 10/1975 Hale ...................................... 427/255
4,179,301 12/1979 Buljan .................................. 501/154
4,249,913 2/1981 Johnson et al. ....................... 51/295

*Primary Examiner*—Donald E. Czaja
*Assistant Examiner*—W. Thompson
*Attorney, Agent, or Firm*—Jerry F. Janssen; Ivan L. Ericson

[57] ABSTRACT

Coated composite ceramic cutting tools and cutting tool inserts having improved mechanical and chemical wear resistance under demanding conditions of machining speed, temperature, or workpiece hardness comprise a composite silicon nitride substrate having at least one hard adherent coating of alumina. The composite silicon nitride substrate consists essentially of a first phase of silicon nitride and a refractory second phase comprising silicon nitride and an effective amount of a densification aid selected from yttrium oxide, zirconium oxide, hafnium oxide, the lanthanide rare earth oxides, and mixtures thereof.

13 Claims, No Drawings

ALUMINA COATED COMPOSITE SILICON NITRIDE CUTTING TOOLS

CROSS-REFERENCE TO RELATED APPLICATIONS

This application contains subject matter related to matter disclosed and claimed in copending patent application, Ser. No. 128,070 filed Mar. 7, 1980 entitled "Abrasion Resistant Silicon Nitride Based Articles" and in the following copending applications filed May 20, 1983 concurrently herewith, all assigned to the assignee of the present application:

Application Ser. No. 380,364 entitled "Composite Ceramic Cutting Tool";

Application Ser. No. 380,361 entitled "Process for Making a Modified Silicon Aluminum Oxynitride Based Composite Cutting Tool";

Application Ser. No. 380,384, entitled "Carbide Coated Silicon Nitride Cutting Tools";

Application Ser. No. 380,363, entitled "Alumina Coated Silicon Nitride Cutting Tools";

Application Ser. No. 380,381, entitled "Carbonitride Coated Silicon Nitride Cutting Tools";

Application Ser. No. 380,383, entitled "Nitride Coated Silicon Nitride Cutting Tools";

Application Ser. No. 380,362, entitled "Carbide Coated Composite Silicon Nitride Cutting Tools";

Application Ser. No. 380,382, entitled "Carbonitride Coated Composite Silicon Nitride Cutting Tools";

Application Ser. No. 380,380, entitled "Nitride Coated Composite Silicon Nitride Cutting Tools";

Application Ser. No. 380,387, entitled "Carbide Coated Composite Modified Silicon Aluminum Oxynitride Cutting Tools";

Application Ser. No. 380,388, entitled "Alumina Coated Composite Modified Silicon Aluminum Oxynitride Cutting Tools";

Application Ser. No. 380,389, entitled "Carbonitride Coated Composite Modified Silicon Aluminum Oxynitride Cutting Tools";

Application Ser. No. 380,452, entitled "Nitride Coated Composite Modified Silicon Aluminum Oxynitride Cutting Tools".

FIELD OF THE INVENTION

This invention relates to cutting tools and cutting tool inserts. More particularly, it is concerned with composite silicon nitride ceramic cutting tools and tool inserts having one or more thin adherent coating layers of alumina.

BACKGROUND OF THE INVENTION

Cemented carbide materials are well known for their unique combination of properties of hardness, strength, and wear resistance and have accordingly found extensive use in mining tool bits, metal cutting and boring tools, metal drawing dies, wear resistant machine parts and the like. It is known that the wear resistance of cemented carbide materials may be enhanced by the application of thin coatings of a highly wear resistant material such as titanium carbide or aluminum oxide. These coated carbide materials are finding increasing commercial utility for certain cutting tool and machining applications.

Economic pressures for higher productivity in machining applications are placing increasing demands upon the performance of cutting tool materials. To achieve high productivity in machining, a tool must be able to cut at high speeds. At cutting speeds exceeding 1500 surface feet per minute (sfpm), the high temperature strength and chemical inertness of a cutting tool material become more and more important. The usefulness of cemented carbide cutting tool materials (the predominant material used in cutting tools today) has been extended to applications requiring cutting speeds of about 1500 sfpm by coating such tools with aluminum oxide. For cutting speeds in excess of 1500 sfpm, cemented carbide tools encounter problems associated with loss of strength and tool nose deformation, which affect dimensional tolerance in the workpiece and contribute to shorter tool life.

Conventional ceramic cutting tools overcome many of these disadvantages but have some limitations relating to their lower impact strength and fracture toughness. This is especially true of many alumina-based conventional ceramic cutting tools. Silicon nitride-based ceramic cutting tools have significantly higher impact strength and fracture toughness, but can exhibit lower than desired chemical inertness when employed in cutting long-chipping metals such as steel.

OBJECTS OF THE INVENTION

It is therefore an object of the present invention to provide improved cutting tools and cutting tool inserts.

It is another object of this invention to provide improved cutting tool inserts useful in the machining of metals under demanding conditions of machining speed, temperature, or workpiece hardness.

It is another object of the present invention to provide an improved abrasion resistant composite ceramic cutting tool with improved performance in cutting long-chipping workpiece materials.

SUMMARY OF THE INVENTION

These and other objects, advantages and capabilities are achieved in accordance with the present invention wherein a coated cutting tool or cutting tool insert comprises a composite silicon nitride substrate body having at least one adherent coating of alumina. More particularly, the substrate consists essentially of particles of a refractory material uniformly distributed in a matrix. The matrix consists essentially of a first phase of silicon nitride and a refractory second phase comprising silicon nitride and an effective amount of a densification aid selected from the group consisting of yttrium oxide, magnesium oxide, zirconium oxide, hafnium oxide, the lanthanide rare earth oxides, and mixtures thereof.

DETAILED DESCRIPTION

Cutting tools and tool inserts according to the present invention comprise a composite silicon nitride substrate comprising finely divided particles of a hard refractory material uniformly distributed in a densified silicon nitride matrix. By the term hard refractory material, as used throughout this specification and the appended claims, is meant any carbide and/or nitride and/or carbonitride of a refractory metal, including mixtures and solid solutions thereof. Particular hard refractory materials contemplated as falling within the scope of this invention are materials selected from the foregoing which have a microhardness greater than about 1000 kg/mm$^2$ and a fusion or decomposition temperature greater than about 1500° C. Typical hard refractory materials are the carbides and/or nitrides and/or carbonitrides of titanium, vanadium, chromium, zirconium, niobium, molybdenum, hafnium, tantalum and tungsten, including combinations and solid solutions thereof. The most preferred hard refractory particulates are titanium carbide, titanium nitride, titanium carbonitride, hafnium carbide and hafnium nitride. The particles of the hard refractory material are uniformly distributed in a matrix consisting essentially of a first phase of silicon nitride and a refractory second phase comprising silicon nitride and an effective amount of a densification aid selected from the group consisting of yttrium oxide, zirconium oxide, hafnium oxide, the lanthanide rare earth oxides, and mixtures thereof.

The average particle size of the hard refractory particulate ranges between about 0.5 micron to about 20 microns, preferably from about 0.5 microns to about 5 microns.

The useful life and performance of cutting tools and tool inserts in accordance with this invention depend to a large measure on the volume fraction taken up by the particulate hard refractory material of the total composite. It has been found that the hardness of the cutting tool substrate body generally increases with increasing volume percent content of the particulate hard refractory material up to about 60 volume percent, but in order to obtain highest hardness and fracture toughness, it is preferred that the cabride and /or nitride and/or carbonitride particulate contained in the substrate body ranges between about 15 to about 50 volume percent, more preferably between about 20 to about 40 volume percent.

The substrate body of coated composite silicon nitride cutting tools and tool inserts in accordance with this invention possesses a composite microstructure in which the hard refractory particulate is distributed throughout a host matrix. The matrix consists essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof.

Because the intergranular phase is essentially continuous, and because impurities and additives present in the overall composite substrate body tend to concentrate in the intergranular phase during the densifying process, the composition of the interganular phase profoundly affects the high temperature properties of the densified composite.

It is considered important to incorporate into this intergranular phase of the host matrix a densification aid which permits densification to densities approaching theoretical, and at the same time does not deleteriously affect the high temperature strength and creep resistance of the overall composite. Typical densification aids useful for this purpose are metal oxides selected from magnesium oxide, yttrium oxide, zirconium oxide, hafnium oxide, the lanthanide rare earth oxides, and mixtures thereof. Yttrium oxide and hafnium oxide are preferred. The metal oxide densification air is employed in amounts from a lower effective amount which permits full densification to an upper amount which does not unduly affect the high temperature properties of the body. Preferably the metal oxide densification aid comprises from about 1 weight percent to about 25 weight percent of the two phase host matrix in which the hard refractory particulate is dispersed. More preferably, the metal oxide comprises from about 1 weight percent to about 5 weight percent of the host matrix.

Silicon dioxide is added to the initial powder mixture employed in the formation of the substrate body or alternatively, is present as a surface oxide coating on the silicon nitride employed. During subsequent processing of the powder mixture to form the densified composite silicon nitride substrate body, the silicon dioxide and metal oxide densification aid tend to concentrate in the intergranular phase. It is preferred that the amount of silicon dioxide present in the final densified body comprise less than about 5 weight percent of the host matrix.

The intergranular phase of the substrate host matrix may contain further additional materials in the form of additives or impurities in addition to the above-mentioned silicon dioxide and metal oxide densification aids. Such further additional materials are preferably present in amounts less than about 5 weight percent of the host matrix.

In accordance with the principles of the present invention, the substrate body is coated with at least one hard, adherent coating layer comprising aluminum oxide. The coating layer is of a thickness ranging between about 0.1 microns to about 20 microns, preferably between about 1.0 and about 10 microns. Exemplary methods of making coated cutting tools and tool inserts in accordance with this invention are given below. The methods are to be viewed as illustrative and are not to be viewed as limiting the scope of the invention as defined by the appended claims. Methods I and II below illustrate methods of preparing the substrate body of cutting tool inserts of this invention. In one method, pressed green compacts containing silicon nitride, a hard particulate refractory material, silicon dioxide, and one or more metal oxides serving as densification aids are sintered to a dense body. In the other method, dry powder mixtures of the above materials are hot pressed to produce a shaped cutting tool insert.

METHOD I

To one part by weight of a powder mixture of silicon nitride, a hard refractory material, and metal oxide densification aid are added about 2.5 parts by weight of toluene, 0.1 parts by weight of methanol, and about 0.05 parts by weight of stearic acid. The resulting slurry is thoroughly mixed by ball milling and then dried at 75° C. The resulting dry mixture is ball milled for about 24 hours and then mixed with about 0.05 parts by weight of a copolymer of polyethylene glycol and methoxypolyethylene glycol, 1 part by weight toluene, and about 0.05 parts by weight methanol. This mixture is mixed by ball milling for about 15 minutes, dried at 75° C. and then screened through a 60 mesh screen. The −60 mesh fraction is pressed at ambient temperatures at a pressure of about 25,000 psig to obtain a green compact. The residual solvents and stearic acid binder are removed from the green compact by heating at about 600° C. in an inert atmosphere. The green compact is then sintered to a hard, highly densified composite body by heating at a temperature of between about 1700° C. to about 1850° C.

Method II

The procedure of Method I is followed to the point of obtaining the −60 mesh dry power mixture. This material is then pressed at a pressure of about 3000 psig and a temperature of about 1700° C. to produce a hard, highly densified composite body.

Coating Methods

The composite substrate bodies produced by the methods detailed above are coated with aluminum oxide by chemical vapor deposition techniques or physical vapor deposition techniques known in the art. In one chemical vapor deposition technique, more fully described in U.S. Pat. No. 3,914,473, vaporized aluminum chloride or other halide of aluminum is passed over the heated substrate together with water vapor and hydrogen gas. Alternatively, the aluminum oxide is deposited by physical vapor deposition techniques such as direct evaporation or sputtering. The reaction for the chemical vapor deposition technique is described by the following equation, although hydrogen gas is often added to insure that the reaction takes place in a reducing atmosphere:

$$2AlCl_3 + 3H_2O = Al_2O_3 + 6HCl$$

The substrate piece or pieces are heated to a temperature between about 800° C. to about 1500° C. in a furnace equipped for gaseous flow. The aluminum chloride supply is pre-heated to vaporize the material, and the aluminum chloride vapor is passed through the furnace, together with the other gases. The gas mixture is passed over the heated substrate until the desired coating thickness is achieved. Routine experimentation is used to determine the rate of coating thickness growth at a particular gaseous flow rate and temperature.

In another, preferred method of coating the composite silicon nitride substrate bodies with one or more adherent alumina coating layers, aluminum chloride is reacted with carbon dioxide in the presence of hydrogen gas according to the following equation:

$$2AlCl_3 + 3CO_2 + 3H_2 = Al_2O_3 + 3CO + 6HCl;$$

carbon monoxide is optionally added to the gas mixture passed over the heated substrate bodies in order the establish the desired equilibrium gas composition. The following example illustrates the preparation of alumina coated composite silicon nitride cutting tool inserts by this latter method.

EXAMPLE

A batch of 50 composite cutting tool inserts having the composition 54% $Si_3N_4$ and 6% $Y_2O_3$ containing 30 volume percent TiC were heated in a hydrogen gas atmosphere to a temperature of about 1200° C. At that temperature, a mixture of 70% $H_2$, 5% $CO_2$, 20% CO, and 5% $AlCl_3$ was introduced into the reaction chamber. The gas pressure was maintained at 50 Torr and a linear gas flow rate of 20 liters/minute was maintained. After 6 hours the coated tools were removed and the thickness of the alumina coating layer was determined to be about 2-3 microns by scanning electron microscope techniques.

While there have been shown and described what are at present believe to be the preferred embodiments of the invention, it will be obvious to one skilled in the art that various modifications may be made therein without departing from the scope of the invention as defined by the appended claims.

What is claimed is:

1. A coated composite ceramic cutting tool comprising a composite silicon nitride substrate body having at least one adherent coating layer; said substrate body consisting essentially of particles of a hard refractory material uniformly distributed in a matrix consisting essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof; said adherent coating layer consisting essentially of aluminum oxide.

2. A coated composite ceramic cutting tool in accordance with claim 1 wherein said adherent coating layer is of a thickness between about 0.1 microns and 10 microns.

3. A coated composite ceramic cutting tool in accordance with claim 2 wherein said adherent coating is of a thickness between about 1.0 and about 10 microns.

4. A coated composite ceramic cutting tool in accordance with claim 1 wherein said hard refractory material is selected from the group consisting of carbides, nitrides, carbonitrides and solid solutions thereof of titanium, vanadium, chromium, zirconium, niobium, molybdenum, hafnium, tantalum, and tungsten and mixtures thereof.

5. A coated composite ceramic cutting tool in accordance with claim 4 wherein said hard refractory material is selected from the group consisting of titanium carbide, titanium nitride, titanium carbonitride, hafnium carbide, hafnium nitride, and hafnium carbonitride.

6. A coated composite ceramic cutting tool in accordance with claim 4 wherein the average particle size of said hard refractory material is between about 0.5 microns to about 20 microns.

7. A coated composite ceramic cutting tool in accordance with claim 6 wherein the average particle size of said hard refractory material is less than about 5 microns.

8. A coated composite ceramic cutting tool in accordance with claim 1 wherein said hard refractory material is present in said substrate in an amount of up to about 60 volume percent.

9. A coated composite ceramic cutting tool insert in accordance with claim 8 wherein said hard refractory material is present in said substrate in an amount of between about 15 volume percent to about 50 volume percent.

10. A coated composite ceramic cutting tool in accordance with claim 9 wherein said hard refractory material is present in said substrate in an amount of between about 20 volume percent and about 40 volume percent.

11. A coated composite ceramic cutting tool in accordance with claim 1 wherein said metal oxide densification aid is yttrium oxide or hafnium oxide.

12. A coated composite ceramic cutting tool in accordance with claim 1 wherein said metal oxide is present in an amount of between about 1 weight percent to about 25 weight percent of said two phase matrix.

13. A coated composite ceramic cutting tool in accordance with claim 1 wherein silicon dioxide is presnt in an amount less than five weight percent of the matrix.

* * * * *